US005733642A

United States Patent [19]

Ogura et al.

[11] Patent Number: 5,733,642

[45] Date of Patent: Mar. 31, 1998

[54] TRANSFER PAPER FOR COLOR ELECTROPHOTOGRAPHY

[75] Inventors: Motohiro Ogura, Machida; Tatsuo Takeuchi, Kawasaki, both of Japan

[73] Assignee: Canon Kabushiki Kaisha, Tokyo, Japan

[21] Appl. No.: 648,487

[22] Filed: May 15, 1996

[30] Foreign Application Priority Data

May 15, 1995 [JP] Japan .................................... 7-138851

[51] Int. Cl.$^6$ ........................................ B32B 3/00

[52] U.S. Cl. .......................... 428/211; 428/195; 428/204; 428/212; 428/213; 428/411.1; 428/688; 428/913; 162/168.1

[58] Field of Search .................................... 428/195, 204, 428/212, 411.1, 913, 211, 213, 688; 162/168.1

[56] References Cited

U.S. PATENT DOCUMENTS

| | | | |
|---|---|---|---|
| 3,950,595 | 4/1976 | Tanaka et al. | 428/511 |
| 4,296,171 | 10/1981 | Imai | 428/323 |
| 4,778,711 | 10/1988 | Hosomura et al. | 428/211 |
| 5,614,325 | 3/1997 | Chartier et al. | 428/257 |

FOREIGN PATENT DOCUMENTS

| | | | |
|---|---|---|---|
| 2698389 | 5/1994 | France . | |
| 5-82938 | 4/1993 | Japan | H05K 3/00 |
| 5-82940 | 4/1993 | Japan | H05K 3/12 |

OTHER PUBLICATIONS

Patent Abst. of Japan, 5, No. 118, (P–073) 1981 for JP 56–59240.

Patent Abst. of Japan, 4, No. 82, (P–015) 1980 for JP 55–46762.

*Primary Examiner*—William Krynski
*Attorney, Agent, or Firm*—Fitzpatrick, Cella, Harper & Scinto

[57] ABSTRACT

A transfer paper for color electrophotography has an intermediate layer and transfer layers respectively provided on the surface side and back side of the intermediate layer. The intermediate layer has a surface resistivity which is higher than the surface resistivity of the transfer layers. The transfer paper has a basis weight of from 100 g/m$^2$ to 160 g/m$^2$. The surface of the transfer paper has a Bekk smoothness within the range of from 100 seconds to 200 seconds.

23 Claims, 4 Drawing Sheets

TRANSFER PAPER FOR COLOR ELECTROPHOTOGRAPHY

BACKGROUND OF THE INVENTION

1. Field of the Invention

This invention relates to a transfer paper for color electrophotography, particularly a transfer paper for transferring a color toner image, and more particularly, to a transfer paper for color electrophotography that can obtain high-quality images, better preventing uneven-discharge blank images which may occur when recording in an environment of low humidity, and promising a good toner transfer performance when recording in an environment of high humidity, when used as a thick transfer paper for electrophotography, having a basis weight of from 100 g/m$^2$ to 160 g/m$^2$, as used in full-color copying machines or full-color printers.

2. Related Background Art

In recent years, in copying machines and printers of electrophotographic systems, color representation and digital processing have been put forward and a higher image quality has been achieved. Accordingly, the transfer paper for electrophotography is required to have a more highly uniform transfer performance. To cope with this requirement, surface properties and surface resistivity of the paper must be taken into account as properties of transfer paper that affect toner transfer performance.

With regard to the surface properties, commonly available electrophotographic transfer paper of a woodfree type, called PPC paper or NIP paper, is chiefly used for the printing of line images such as characters and oblique lines at most. Hence, the paper is not required to have a highly efficient toner transfer performance, where writing performance and toner fixing performance are regarded more important than the transfer performance. Thus, the surface properties required in such electrophotographic transfer paper of a woodfree type are as low as 15 to 80 seconds as the Bekk smoothness.

However, in high-performance full-color copying machines and full-color-printers widely used in recent years, it is the main theme to print or reproduce solid images, because of the feature of color representation. Hence, uneven toner transfer appears as uneven color density at solid areas to cause a lowering of image quality in color images.

For the foregoing reasons, the transfer paper for electrophotography, used in full-color copying machines and printers, is required to have a more highly uniform toner transfer performance than transfer paper for use in monochromatic copying machines and printers. Under existing circumstances, this performance is more and more highly required as the performance of hardware has become higher in recent years.

When solid images are printed on usual PPC paper or NIP paper, using, for example, a full-color copying machine, uneven transfer occurs which is believed due to an uneven basis weight or uneven thickness of the paper. That is, it can be said that, in order to improve the toner transfer performance, it is necessary to improve the surface smoothness of the paper.

As additional circumstances, transfer paper with a basis weight of 50 to 85 g/m$^2$, and chiefly of 64 g/m$^2$, has been used for monochromatic copying machines and printers, but, in full-color copying machines and printers, as their use has become wider with the achievement of higher image quality, thick transfer papers with a basis weight of 100 g/m$^2$ or more such as postcards and cardboards are often used. In the case of such a thick transfer paper, a lowering of image quality which is believed due to the surface properties of the transfer paper widely occurs.

Transfer paper having a high smoothness may include, for example, coated paper. Use of coated paper as the transfer paper for electrophotography, however, has caused problems in that double feeding or paper jam may occur because of the coated papers' high coefficient of friction, and, because of no air permeability of its coat layer, the phenomenon called "blister" tends to occur, which is a phenomenon where the moisture content in the paper layer evaporates when the toner is fixed using a heat roll, and cracks the coat layer or the toner layer.

To cope with these problems, methods are proposed in which a lubricant is added to the coat layer (Japanese Patent Application Laid-open No. 5-82938) or a pigment having a small average particle diameter and a high oil absorption is used as a coloring matter of the toner to thereby prevent an increase in permeability so that blistering can be prevented (Japanese Patent Publication No. 5-82940). Both the methods, however, have a problem in that they cause a cost increase. In addition, the coated paper has another problem because its writing performance is poor when written upon with a pencil.

The surface resistivity of the transfer paper is an important factor when determining image quality such as toner transfer performance, controlled in the range of from $1\times10^9$ to $1\times10^{11}$ Ω/square using a conductive agent. The surface resistivity, however, is greatly affected by the moisture of the paper, i.e., by service environment. Hence, the PPC paper and NIP paper are usually moistureproof-packaged with a polyethylene bag or polyethylene laminated paper for their storage. The high-performance full-color copying machines and full-color printers used in recent years are so designed as to detect the environmental conditions (temperature and humidity) in the printing zone of such apparatus so that the toner can be transferred under conditions suited for the surface resistivity expected from the environment. Thus, it has been possible to obtain good-quality images in any environment ranging from an environment of low temperature and low humidity of 10° C./5%RH to an environment of high temperature and high humidity of 30° C./85%RH.

However, when using thick transfer paper having a basis weight of 100 g/m$^2$ or more as used in the full-color image formation as stated above, a local discharge phenomenon due to non-uniform charging on the paper surface occurs in an environment of low temperature and low humidity of, for example, 15° C./20%RH or below (this phenomenon is hereinafter called uneven-discharge blank images). Such uneven-discharge blank images are caused by separation discharge occurring in the area on the photosensitive drum from which the transfer paper is separated after transfer. Hence, this occurs more often as the surface resistivity of the transfer paper is higher, the surface roughness of the transfer paper is higher and the thickness of the transfer paper is larger.

Thus, the problems of the insufficient surface properties (smoothness) and the uneven-discharge blank images occurring in an environment of low humidity tend to arise in the case when the conventionally known, thick transfer paper for electrophotography is used in the contemporary high-performance full-color electrophotographic copying machines and full-color printers available recently.

SUMMARY OF THE INVENTION

An object of the present invention is to provide a transfer paper for color electrophotography that has solved the above problems.

Another object of the present invention is to provide a thick transfer paper for color electrophotography that can enjoy a low cost, has a sufficient writing performance when written with a pencil, has a superior toner transfer performance and can provide full-color images with a high image quality, in any environment of normal temperature/normal humidity, normal temperature/low humidity and high temperature/high humidity.

The present invention provides a transfer paper for color electrophotography, comprising;

an intermediate layer, and transfer layers respectively provided on the surface side and back side of the intermediate layer, wherein;

the intermediate layer has a surface resistivity which is at least twice as high as the surface resistivity of the transfer layers;

the transfer paper has a basis weight of from 100 g/m$^2$ to 160 g/m$^2$; and the surface of the transfer paper has a Bekk smoothness within the range of from 100 seconds to 200 seconds.

DESCRIPTION OF THE PREFERRED EMBODIMENTS

Figure 1:
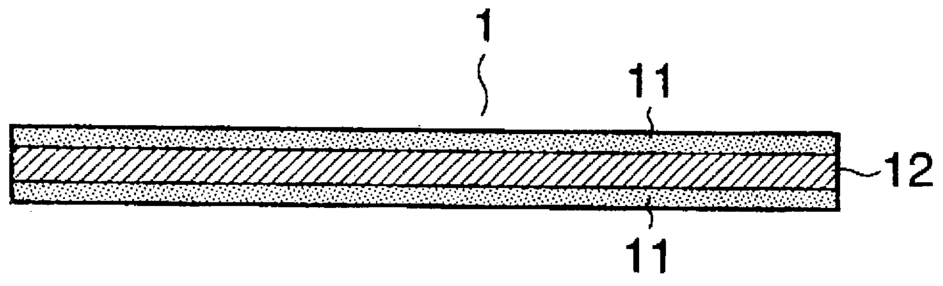
FIG. 1 is a cross-sectional view diagrammatically illustrating the constitution of the transfer paper for full-color electrophotography of the present invention.

The of occurrence of the uneven-discharge blank images in an environment of low temperature and low humidity is considered due to the part having positive charges that is locally formed on the surface of transfer paper because of the localization of corona discharge, occurring at the time of toner transfer when the surface resistivity of the transfer paper becomes as very high as $1\times10^{12}$ Ω/square. In other words, the surface of the transfer paper has an uneven surface resistance in microscopic view, and the corona discharge localizes to the part having an especially high surface resistance. This can be said to be the cause of the uneven-discharge blank images. Such localization of discharge occurs more as the thickness of the transfer paper is enhanced. For example, when the transfer paper having a basis weight of 100 g/m$^2$ or more as previously stated is used, its thickness is so large that a phenomenon where electric charges flow in the thickness direction may occur to tend to cause uneven surface resistance, and tend to cause uneven transfer such as the uneven-discharge blank images. As a measure against it, even if the transfer paper is made to have a lower surface resistivity in order to solve this problem, such a simple measure results in a great decrease in surface resistance of the transfer paper in an environment of high temperature and high humidity to cause faulty transfer of toner.

The present inventors made extensive studies on how the uneven-discharge blank images occurring in an environment of low temperature and low humidity could be prevented without causing the faulty transfer of toner in an environment of high temperature and high humidity. As the result, they have discovered that at least one intermediate layer may be provided in the transfer paper and the surface resistivity of this intermediate layer may be made higher than the surface resistivity of transfer layers respectively provided on the surface side and back side of the intermediate layer, whereby the transfer paper itself little causes a decrease in its surface resistivity, and also electric charges no longer flow in the thickness direction of the transfer paper and flow in the face direction of the transfer paper, so that the toner can be uniformly transferred to the surface of the transfer paper to form uniform images, the images can be free from uneven transfer, and also the problem of uneven-discharge blank images occurring in an environment of low temperature and low humidity can be solved. Thus, they have accomplished the present invention.

The present invention will be described below in detail by giving preferred embodiments of the present invention.

The transfer paper for color or full-color electrophotography of the present invention is a thick paper having a basis weight of from 100 to 160 g/m$^2$, has an intermediate layer in it, and has at least three-layer structure wherein transfer layers are respectively provided on the surface side and back side of the intermediate layer; the surface resistivity of this intermediate layer being higher than the surface resistivity of the transfer layers. The surface resistivity of the intermediate layer may preferably be higher at least twice, more preferably at least three times, and, most preferably at least five times, than the surface resistivity of the transfer layers, and also the surface of the transfer layer may have a Bekk smoothness within the range of from 100 to 200 seconds, preferably from 100 to 160 seconds, and more preferably from 100 to 140 seconds.

The basis weight of the transfer paper of the present invention is 100 to 160 g/m$^2$ in terms of dry weight.

If the surface resistivity of the intermediate is equal to or lower than the surface resistivity of the transfer layers, the flow of electric charges in the thickness direction of the transfer layer can not be prevented to cause the uneven-discharge blank images due to uneven transfer.

The transfer paper for color electrophotography of the present invention is concerned with a thick paper having a basis weight of from 100 to 160 g/m$^2$. This is because, if the transfer paper has a basis weight less than 100 g/m$^2$, no non-uniform discharge may occur in the environment of low temperature and low humidity since the electric charges may flow in the thickness direction with difficulty, and also, from the viewpoint of production process, it is difficult to provide the three-layer structure. A very thick transfer paper having a basis weight more than 160 g/m$^2$ is also not preferable because the electric charges may flow in the thickness direction with ease to tend to make the surface resistance uneven, even when the paper has the three-layer structure as in the present invention.

As previously stated, in order to bring out the performances inherent in the high-performance electrophotographic copying machines and printers available in recent years, to achieve the intended high image quality, the surface of the transfer paper must have a smoothness as high as 100 to 200 seconds in terms of the Bekk smoothness as stated below. More specifically, transfer paper surface having a Bekk smoothness less than 100 seconds is not preferable because the electric charges tend to become uneven in the thickness direction to cause non-uniform discharge. Transfer paper surface having a Bekk smoothness more than 200 seconds, in other words, having a roughness of 1.7 μm or less as a center-line surface roughness, is also not preferable because the troubles such as double feeding or paper jam may occur or pencil writing performance may be poor as previously stated.

As methods commonly used to achieve the smoothness of 100 seconds or more in woodfree paper, a method may be used in which, after paper has been made using a paper machine, the surface of paper is subjected to smoothing such as supercalendering. According to the studies made by the present inventors, however, it has been confirmed that a higher smoothness can be more readily achieved when a coating solution containing an inorganic pigment and a water-soluble binder in a weight ratio within the range of from 100/30 to 100/100, preferably from 100/40 to 100/80, is coated on the surface of the paper, followed by drying and thereafter smoothing. It has been also found that images with a higher image quality can be obtained when the coating solution containing the components in the above proportion is coated, even when the paper obtained has like smoothness and like surface roughness.

In order to supercalender the woodfree paper to achieve a high smoothness of from 100 to 200 seconds as the Bekk smoothness, a reasonably high nip pressure is required, and hence there is a possibility that a strain is caused in the paper layer to make paper formation poor. On the other hand, images with a higher image quality can be obtained when a coating solution in which an inorganic pigment holds about 50% to 70% of the solid matter of the coating solution is coated so as to be in a coating weight of at least 2 g/m$^2$, preferably from 2 to 8 g/m$^2$, and more preferably from 2 to 6 g/m$^2$, as dry solid matter per one side, even when the paper has substantially the same Bekk smoothness or surface roughness as the paper treated by supercalendering. This is because the surface roughness can be made denser when the surface of the transfer paper is coated with an inorganic pigment to a certain extent, and hence images with a higher-grade quality can be formed. However, in this instance, a coating weight more than 8 g/m$^2$ as dry solid matter per one side is not preferable because the paper can no longer have aesthetic properties at the rank of woodfree paper, and may have a poor pencil writing performance. Hence, in the present invention, the transfer paper may preferably be manufactured in the following way.

First, the intermediate layer is formed in the same manner as the manufacture of conventional thick paper. As a material therefor, pulp such as L.B.K.P. (hardwood kraft pulp) or N.B.K.P. (softwood kraft pulp) is used. To the pulp, a sizing agent such as rosin, aluminum sulfate, starch, casein or silicate is added to carry out beating, followed by addition of a filler such as titanium oxide, kaolin, zinc sulfate or talc, and the paper making is carried out using a paper machine such as a Fourdrinier paper machine. The paper obtained is used as the intermediate layer. The intermediate layer may be formed in a thickness of from 95 to 180 μm, and more preferably from 120 to 150 μm. If the intermediate layer has a thickness smaller than 95 μm, the paper may become too thin in the smoothing step described later, resulting in a low stiffness of paper. If the intermediate layer has a thickness larger than 180 μm, the paper may have a high spring back, making it difficult to achieve the desired smoothness.

In the case when the intermediate layer is formed by coating the coating solution, the thickness of a coat layer is included in the thickness of the intermediate layer.

The intermediate layer may be controlled to have a surface resistivity of about 1×10$^{14}$ Ω/square in an environment of 23° C./5%RH. Methods therefor include, for example, a method in which, during the paper making for the intermediate layer, a conductive agent such as sodium chloride, potassium chloride, sodium sulfate, potassium sulfate, a styrene-maleic acid copolymer or a quaternary ammonium salt is added together with the filler to control the surface resistivity of the intermediate layer, and a method in which the surface of the intermediate layer obtained by the paper making described above is coated with a coating solution prepared by adding an inorganic pigment and a water-soluble binder and further adding the conductive agent described above or a low-resistance treatment described later, to control the surface resistivity of the intermediate layer.

Thus, in the present invention, the intermediate layer is formed of at least the pulp, a binder such as the water-soluble binder, and the filler, optionally further having the conductive agent, a low-resistance treatment and the sizing agent.

As the low-resistance treatment, which is an agent used to decrease the surface resistivity of the transfer paper, any of cationic low-resistance treatments and anionic low-resistance treatments may be used, which specifically may include the following.

For example, the cationic low-resistance treatments may include quaternary ammonium salts as exemplified by, polyvinyl benzyltrimethylammonium chloride, polyvinyl benzyltriethylammonium chloride, polydimethyl diallylammonium chloride, polydiethyl diallylammonium chloride, polyethyleneimine hydrochloride, poly-4-vinyl-N-methylpyridinium chloride, poly-2-hydroxy-3-methacryloxypropyl trimethylammonium chloride, poly-2-hydroxy-3-methacryloxypropyl triethylammonium chloride, poly-2-hydroxy-3-acryloxypropyl trimethylammonium chloride, poly-2-hydroxy-3-acryloxypropyl triethylammonium chloride, poly-2-methacryloxyethyl trimethylammonium chloride, poly-2-methacryloxyethyl triethylammonium chloride, poly-2-acryloxyethyl trimethylammonium chloride, poly-2-acryloxyethyl triethylammonium chloride, polystyrene ethyl acrylate trimethylammonium chloride, and polystyrene ethyl acrylate triethylammonium chloride; any of which may be used alone or in combination.

The anionic low-resistance treatments may include polymeric electrolytes as exemplified by polystyrene sulfonates (sodium salts or ammonium salts), polyacrylates (sodium salts or ammonium salts), polymethacrylates (sodium salts or ammonium salts), polyvinyl sulfonates (sodium salts or ammonium salts), and polyvinyl phosphates (sodium salts or ammonium salts); any of which may be used alone or in combination.

In the present invention, the surface resistivity of the intermediate layer formed in the manner as described above is required to be higher, and preferably at least five times higher, than the surface resistivity of the transfer layers provided on the surface side and back side of the intermediate layer. The surface resistivity of the intermediate layer may preferably be controlled so as to be higher than 1×10$^{14}$ Ω/square, and more preferably from 5×10$^{14}$ Ω/square to 1×10$^{15}$ Ω/square, in an environment of a temperature of 23° C. and a humidity of 5%RH. Making higher the surface resistivity of the intermediate layer than the surface resistivity of the transfer layers in this way makes electric charges flow in the thickness direction with difficulty and flow in the face direction of the paper with ease. Hence, the transfer layers can be uniformly charged, not to cause the local discharge phenomenon to effectively prevent the uneven-discharge blank images.

Next, on the surface side and back side of the intermediate layer thus formed, a coating solution in which an inorganic pigment holds about 30% to 100% of the solid matter of the coating solution is coated so as to be in a coating weight of preferably from 1 to 8 g/$m^2$, and more preferably from 2 to 8 g/$m^2$, as dry solid matter per one side, to form the transfer layers. Thus, the transfer paper for color or full-color electrophotography of the present invention, having the three-layer structure is produced.

The transfer layers may each preferably have a layer thickness of from 0.1 to 0.8 μm, and more preferably from 0.2 to 0.5 μm. If each transfer layer is formed in a layer thickness smaller than 0.1 μm, the transfer layer tends to be non-uniform. If formed in a layer thickness larger than 0.8 μm, the transfer paper may have aesthetic properties like coated paper, resulting in a poor pen or pencil writing performance.

As the inorganic pigment used in the present invention, inorganic pigments commonly used in coated paper may be used, as exemplified by calcium carbonate, kaolin and clay, any of which may be used alone or in combination. The water-soluble binder used together with such an inorganic pigment may include starch, polyvinyl alcohol and latex emulsions, any of which may be used alone or in combination.

Also when the transfer layers are formed, the conductive agent and low-resistance treatment as described above are added in the same manner as the formation of the intermediate layer so that the surface resistivity of the transfer layers can be lower than the surface resistivity of the intermediate layer.

Thus, in the present invention, the transfer layers are formed of at least a binder such as the water-soluble binder, and the low-resistance treatment, optionally further having the conductive agent.

The surface resistivity of the transfer layers may preferably be controlled so as to be within the range of from $1\times10^{12}$ to $1\times10^{14}$ Ω/square, and more preferably from $1\times10^{12}$ to $5\times10^{13}$ Ω/square, in an environment of a temperature of 23° C. and a humidity of 5%RH. If the transfer layers have a surface resistivity lower than $1\times10^{12}$ Ω/square, uneven transfer tends to occur on the side of very low humidity. If they have a. surface resistivity higher than $1\times10^{14}$ Ω/square, uneven transfer tends to occur undesirably in an environment of a very low humidity.

In order to make the surface resistivity different between the transfer layers and the intermediate layer as described above, it is preferable to use conductive agents and low-resistance treatments of the types different from each other when the transfer layers and the intermediate layer are formed.

The coating solution used to form the transfer layers in the present invention may be coated using a coater of any type, as exemplified by off-line coaters such as a blade coater, an air knife coater and a Mayer bar coater, or any of on-line coaters such as a gate roll coater and a Sym size coater as used in the size press step provided in paper machines. In view of the production cost and the advantage that no local uneven moisture content may be caused when the intermediate layer is left to stand, it is preferable to use on-line coaters.

Figure 3:
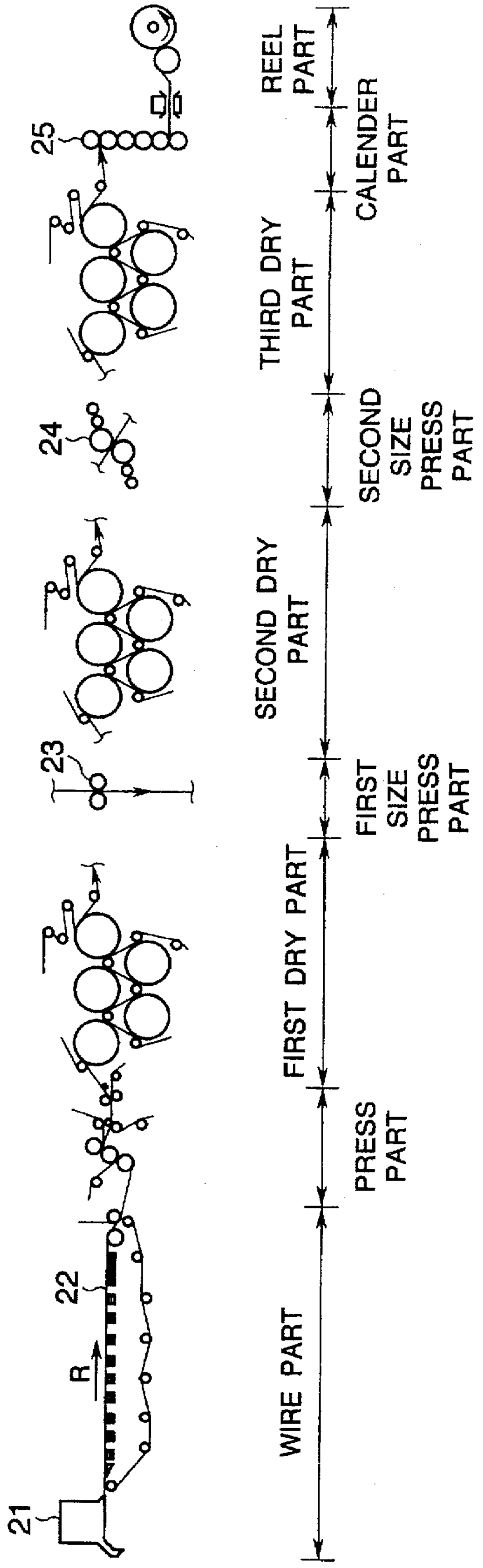
FIG. 3 illustrates a process line for producing the transfer paper of the present invention in an instance where the surface resistivity of the intermediate layer is controlled by coating after paper making.

FIG. 3 illustrates a process for producing the transfer paper of the present invention in an instance where the surface resistivity of the intermediate layer is controlled by coating, using an on-line coater, a resistance-controlling coating solution on the intermediate layer prepared by paper making, and on the intermediate layer thus obtained a transfer layer coating solution for forming the transfer layers is coated using the on-line coater to obtain the transfer paper.

In the production process shown in FIG. 3, a pulp suspension previously prepared as a paper stuff by adding to pulp a filler, a sizing agent, a water-soluble binder as a paper reinforcing agent, a dye and so forth is jetted from a stock inlet 21 over a wire cloth 22 moving in the direction of an arrow R, and is drained in the wire part to obtain a pulp sheet. The pulp sheet is further drained in the press part, and thereafter dried in the first dry part. The pulp sheet thus dried is coated with an intermediate layer coating solution by means of a dip coater 23 in the first size press part. This coating solution well soaks into the pulp sheet, followed by drying in the second dry part to form an intermediate layer. This intermediate layer is coated with a transfer layer coating solution by means of a roll coater 24 in the second size press part, followed by drying in the third dry part. The sheet obtained is then compressed by means of a plurality of rolls 25 in the calender part, where its smoothness is controlled to obtain a transfer paper. Thereafter the transfer paper is wound up in the reel part.

In the above transfer paper production process, the coating solution coated on the pulp sheet must be adjusted to have a low viscosity so that the coating solution well soaks into the pulp sheet when coated by dip coating.

The coating solution used to form the transfer layers may preferably be prepared as a highly viscous coating solution, and be coated in thin layer by Sym size coating or gate roll coating.

Figure 4:
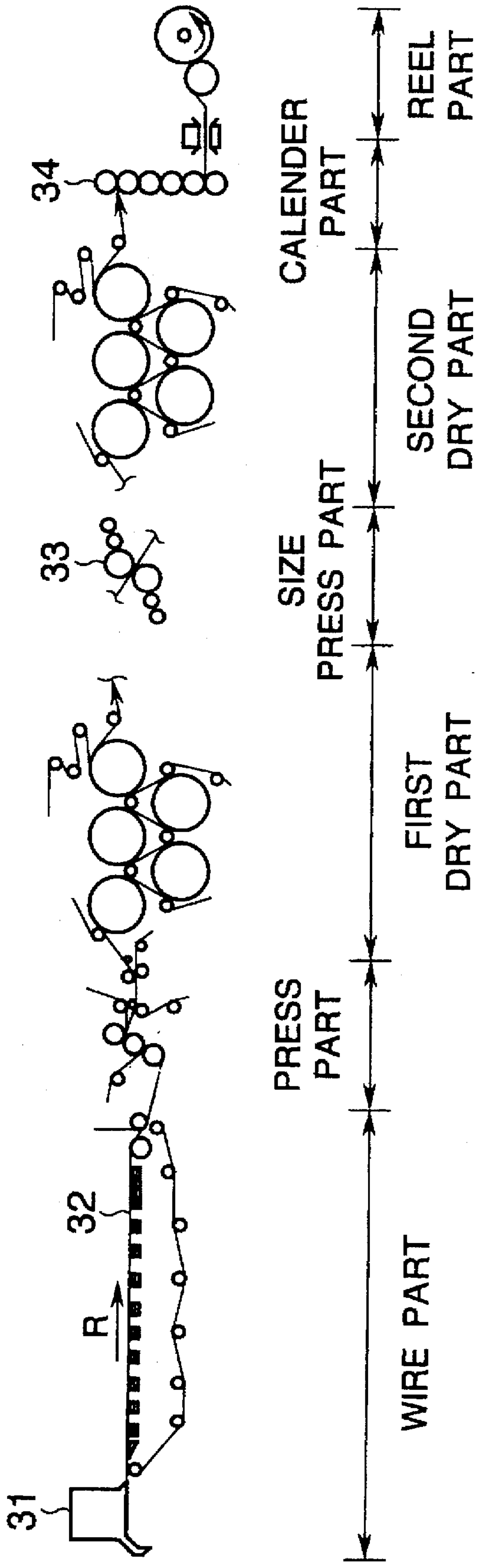
FIG. 4 illustrates a process line for producing the transfer paper of the present invention in an instance where the surface resistivity of the intermediate layer is controlled at the time of paper making.

FIG. 4 illustrates a process for producing the transfer paper of the present invention in an instance where the surface resistivity of the intermediate layer is controlled by using a resistance controlling agent such as a conductive agent during the paper making of the intermediate layer, and on the intermediate layer thus obtained a transfer layer coating solution for forming the transfer layers is coated using an on-line coater to obtain the transfer paper.

In the production process shown in FIG. 4, a pulp suspension previously prepared as a paper stuff by adding to pulp a filler, a sizing agent, a water-soluble binder as a paper reinforcing agent, a dye and so forth is jetted from a stock inlet 31 over a wire cloth 32 moving in the direction of an arrow R, and is drained in the wire part to obtain a pulp sheet. The pulp sheet is further drained in the press part, followed by drying in the first dry part to form an intermediate layer. This intermediate layer dried is coated with a transfer layer coating solution by means of a roll coater 33 in the size press part, followed by drying in the second dry part. The sheet obtained is then compressed by means of a plurality of rolls 34 in the calender part, where its smoothness is controlled to obtain a transfer paper. Thereafter the transfer paper is wound up in the reel part.

In the present invention, the various physical properties are measured by the following measuring methods.

(1) The surface resistivity is measured according to JIS K-6911.

Figure 2:
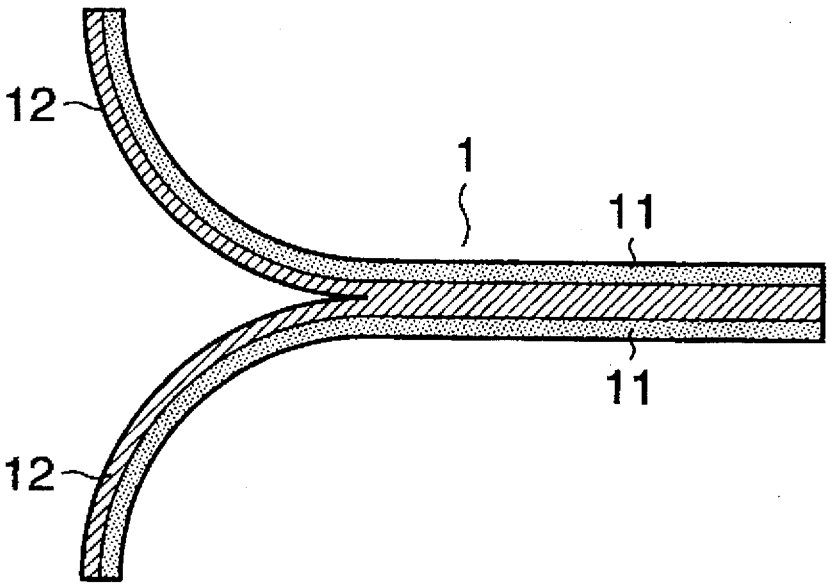
FIG. 2 is a cross-sectional view diagrammatically illustrating the transfer paper, which has been torn off along the intermediate layer after its manufacture.

To measure the surface resistivity of the intermediate layer in the transfer paper in the case when the transfer layers are respectively formed on the surface side and back side of the intermediate layer, the transfer paper is torn off along the intermediate layer as shown in FIG. 2, and the torn surface of the intermediate layer can be measured by the above method for measuring the surface resistivity.

(2) The basis weight of the transfer paper is measured according to JIS P-8124.

(3) The Bekk smoothness of the surface of the transfer paper is measured according to JIS P-8119.

According to the transfer paper for color electrophotography of the present invention, it can enjoy a low cost, has a sufficient writing performance when written with a pencil, especially may cause no uneven-discharge blank images in an environment of low humidity, and can provide full-color images with an excellent transfer performance and a high image quality in any environment of normal temperature/normal humidity, normal temperature/low humidity and high temperature/high humidity.

EXAMPLES

The present invention will be described below in greater detail by giving Examples and Comparative Examples. The present invention is by no means limited to the following Examples.

Example 1

In accordance with the production process as shown in FIG. 3, employing Fourdrinier paper making, paper was made using a pulp suspension prepared by mixing in L.B.K.P. (hardwood kraft pulp) 6% by weight of titanium oxide, 6% by weight of kaolin, 0.5% by weight of aluminum sulfate, 0.3% by weight of rosin size and 3.2% by weight of water-soluble binder, based on the dry weight of base paper (pulp sheet) before coating. The pulp sheet obtained was dried in the first dry part, and thereafter coated with an intermediate layer coating solution having the formulation as shown in Table 1, by means of a dip coater to allow the coating solution to soak into the pulp sheet from both sides of the pulp sheet, followed by drying in the second dry part to form an intermediate layer. Thereafter, the intermediate layer was coated with a transfer layer coating solution having the formulation as shown in Table 1, on its both sides by means of a roll coater in a coating weight of 2.5 g/m$^2$ for each side of the intermediate layer. Then the coatings formed were dried in the third dry part, and the sheet thus obtained was subjected to smoothing in the calender part making use of six rolls. Thus, transfer paper was produced. Here, the concentration of the paper stuff pulp suspension was adjusted in accordance with the paper making speed to control the basis weight of only the intermediate layer to be 152 g/m$^2$.

The constitution of the transfer paper obtained is diagrammatically shown in FIG. 1. The transfer paper has a three-layer structure, having an intermediate layer 12 layer with a thickness of 160 μm and transfer layers 11 with a layer thickness of 0.2 μm each, respectively provided on the surface side and back side of the intermediate layer.

In the above transfer paper production process, the surface resistivity of the intermediate layer formed by paper making was $5\times10^{14}$ Ω/square, and the surface resistivity of the transfer layers of the transfer paper thus produced was $5\times10^{12}$ Ω/square. The transfer paper produced was torn off along the intermediate layer as shown in FIG. 2 to measure the surface resistivity of the torn intermediate layer. As a result, it was equal to the surface resistivity of the intermediate layer obtained by paper making.

The transfer paper obtained had a basis weight of 157 g/m$^2$ and a Bekk smoothness of 123 seconds.

Using the transfer paper thus produced, sheets of paper were fed through a full-color copying machine CLC-700, manufactured by CANON INC., in an environment of 23° C./60%RH, 23° C./5%RH or 30° C./80%RH to form full-color images. Evaluation was made on image uniformity, transfer efficiency and double feeding in each environment.

Results obtained are shown in Table 1. As is seen from the results shown in Table 1, images with a high image uniformity, free of uneven-discharge blank images and uneven transfer, were obtained. Also, neither double feeding nor paper jam occurred.

Example 2

Transfer paper with a three-layer structure, having the physical properties as shown in Table 1 was produced in the same manner as in Example 1 except that the concentration of the pulp suspension was made lower so as to provide a basis weight of 127 g/m$^2$. Using the transfer paper thus obtained, evaluation was made in the same manner as in Example 1. As a result, it was confirmed that, like Example 1, images with a high image uniformity, free of uneven-discharge blank images and uneven transfer, were obtained. The results are shown together in Table 1.

Example 3

Transfer paper with a three-layer structure, having the physical properties as shown in Table 1 was produced in the same manner as in Example 1 except that the concentration of the pulp suspension was made still lower than that in Example 2 so as to provide a basis weight of 104 g/m$^2$. Using the transfer paper thus obtained, evaluation was made in the same manner as in Example 1. As a result, it was confirmed that, like Example 1, images with a high image uniformity, free of uneven-discharge blank images and uneven transfer, were obtained. The results are shown together in Table 1.

Example 4

Transfer paper having the physical properties as shown in Table 1 was produced in the same manner as in Example 1 except that the coating solution used to control the surface resistivity of the intermediate layer was changed as shown in Table 1. Using the transfer paper thus obtained, evaluation was made in the same manner as in Example 1. As a result, although uneven transfer slightly occurred because of a smaller difference in surface resistivity between the transfer layers and the intermediate layer (the surface resistivity of the intermediate layer was twice that of the transfer layers), the transfer paper was acceptable for practical use.

Example 5

Transfer paper having the physical properties as shown in Table 1 was produced in the same manner as in Example 1 except that, in the pulp suspension used to control the surface resistivity of the intermediate layer, the titanium oxide and kaolin were used in an amount of 12% by weight and an amount of 6% by weight, respectively. Using the transfer paper thus obtained, evaluation was made in the same manner as in Example 1. As a result, although transfer efficiency lowered to cause a slight decrease in image density on the whole because of the intermediate layer having a surface resistivity of as high as $5\times10^{15}$ Ω/square, the transfer paper was acceptable for practical use.

Example 6

Transfer paper having the physical properties as shown in Table 1 was produced in the same manner as in Example 1 except that the coating solution used to form the transfer layers was changed as shown in Table 1. Using the transfer paper thus obtained, evaluation was made in the same manner as in Example 1. As a result, although uneven images slightly occurred because of the transfer layers having a surface resistivity of as high as $7\times10^{13}$ Ω/square, the transfer paper was acceptable for practical use.

Example 7

Transfer paper having the physical properties as shown in Table 1 was produced in the same manner as in Example 1 except that the coating solution used to form the transfer layers was changed as shown in Table 1. Using the transfer paper thus obtained, evaluation was made in the same manner as in Example 1. As a result, there were no particular problems in the environment of 23° C./60%RH, but blank images slightly occurred in the environment of 30° C./80%RH because of the transfer layers having a surface resistivity decreased to $8\times10^{11}$ Ω/square.

Example 8

Transfer paper having the physical properties as shown in Table 1 was produced in the same manner as in Example 1 except that the amount of the coating solution used to form the transfer layers was changed to be 8.5 $g/m^2$ per one side. Using the transfer paper thus obtained, evaluation was made in the same manner as in Example 1. As a result, there were no particular problems in the environment of 23° C./60%RH, but, after left for 7 days in the environment of 30° C./80%RH, the paper surface became wavy because of the transfer layers having a layer thickness of as large as 0.9 μm. When images were formed using this paper, uneven transfer slightly occurred at the wavy portions.

Example 9

Transfer paper having the physical properties as shown in Table 1 was produced in the same manner as in Example 1 except that the amount of the coating solution used to form the transfer layers was changed to be 1 $g/m^2$ per one side. Using the transfer paper thus obtained, evaluation was made in the same manner as in Example 1. As a result, the transfer layers had uneven coatings because of the transfer layers having a layer thickness of as small as 0.08 μm, and non-uniform discharge occurred along the uneven coatings, resulting in a lower image uniformity than Example 1.

Example 10

Transfer paper having the physical properties as shown in Table 1 was produced in the same manner as in Example 1 except that, after the calendering was carried out using the six rolls, the paper was further supercalendered to again carry out smoothing. Using the transfer paper thus obtained, evaluation was made in the same manner as in Example 1. As a result, there were no particular problems in the environment of 23° C./60%RH, but double feeding was seen in the environment of 30° C./80%RH because of an increase in coefficient of friction in the transfer layers having surface properties as high as 180 seconds as the Bekk smoothness.

Comparative Example 1

Transfer paper having the physical properties as shown in Table 1 was produced in the same manner as in Example 1 except that the formulation of the coating solution used to form the intermediate layer was changed as shown in Table 1. Using the transfer paper thus obtained, evaluation was made in the same manner as in Example 1. As a result, as shown in Table 1, uneven-discharge blank images occurred.

Comparative Example 2

Transfer paper having the physical properties as shown in Table 1 was produced in the same manner as in Example 2 except that the formulation of the coating solution used to form the intermediate layer was changed as shown in Table 1. Using the transfer paper thus obtained, evaluation was made in the same manner as in Example 1. As a result, as shown in Table 1, uneven-discharge blank images occurred.

Comparative Example 3

Transfer paper having the physical properties as shown in Table 1 was produced in the same manner as in Example 3 except that the formulation of the coating solution used to form the intermediate layer was changed as shown in Table 1. Using the transfer paper thus obtained, evaluation was made in the same manner as in Example 1. As a result, as shown in Table 1, uneven-discharge blank images occurred.

Comparative Example 4

Transfer paper having the physical properties as shown in Table 1, which had the same three-layer structure as in Example 1 and whose intermediate layer and the transfer layers had the same surface resistivity as those in Example 1, but made to have a Bekk smoothness of 60 seconds, was produced in the same manner as in Example 1 except that the amount of the coating solution used to form the transfer layers was changed to be 1 $g/m^2$ per one side. Using the transfer paper thus obtained, evaluation was made in the same manner as in Example 1. As a result, as shown in Table 1, uneven-discharge blank images occurred in part.

Comparative Example 5

Transfer paper having the physical properties as shown in Table 1 was produced in the same manner as in Example 1 except that the intermediate layer coating solution as shown in Table 1 was added in the pulp suspension in an amount of 10% by weight based on the total weight of the pulp suspension and sodium chloride was further added in an amount of 20% by weight based on the dry weight of the transfer papers to carry out the paper making, followed by drying in the first dry part, and thereafter a transfer layer coating solution as shown in Table 1 was coated by means of a dip coater to allow the coating solution to soak into the pulp sheet from both sides of the pulp sheet, followed by drying in the second dry part and thereafter smoothing in the calender part. The transfer paper obtained had a single layer structure. Using the transfer paper thus obtained, evaluation was made in the same manner as in Example 1. As a result, uneven-discharge blank images occurred because of the transfer layers having a surface resistivity of $5\times10^{10}$ Ω/square.

Comparative Example 6

Transfer paper having the physical properties as shown in Table 1 was produced in the same manner as in Example 1 except that the amount of the coating solution used to form the transfer layers was changed to be 8 $g/m^2$ per one side and, after the calendering was carried out using the six rolls, the paper was further supercalendered to again carry out smoothing. Using the transfer paper thus obtained, evaluation was made in the same manner as in Example 1. As a result, as shown in Table 1, double feeding occurred in the environment of 23° C./60%RH and environment of 30° C./80%RH because of the transfer layers having the surface with a Bekk smoothness of 220 seconds.

The results of evaluation in the foregoing Examples 1 to 10 and Comparative Example 1 to 6 are shown together in Table 1.

The evaluation on the image uniformity, transfer efficiency and double feeding was made according to the following evaluation method.

(1) Image uniformity:

Using three color toners, magenta toner, cyan toner and yellow toner, solid images were respectively formed in the combination of one to three toners, and images having been fixed were visually evaluated according to the following evaluation criteria.

(Evaluation criteria)

A: Uneven image density is not visually observable in any combination of one to three toners.

B: Uneven image density is not visually observable in monochrome using any single-color toner, but is observable in the combination of two toners.

C: Uneven image density is visually observable in monochrome using any single-color toner.

(2) Transfer efficiency:

Solid magenta toner images formed on a photosensitive drum are collected on a transparent adhesive tape, and its image density (D1) is measured with Macbeth densitometer or a color reflection densitometer (for example, Color Reflection Densitometer X-RITE 404A, manufactured by X-Rite Co.). Next, solid magenta toner images are again formed on the photosensitive drum, and the solid magenta toner images are transferred to the transfer paper. The solid magenta toner images transferred onto the transfer paper but not yet fixed are collected on a transparent adhesive tape, and its image density (D2) is similarly measured. From the image densities.(D1) and (D2) thus measured, the transfer efficiency is calculated in the following way.

Transfer efficiency (%)=(D2/D1)×100

(Evaluation criteria)

A: 80% or more.

B: 70% or more to less than 80%.

C: Less than 70%.

(3) Double feeding:

Using a commercially available full-color copying machine (CLC-700, manufactured by CANON INC.), a set of 20 sheets of paper was put to the multiple manual paper feed portion, and ten sets of 20 sheets of paper in total were continuously fed. Double feeding rate (%) was calculated as shown below.

Double feeding rate (%)=(double feeding times/total number of sheets of paper feed (200 sheets)×100)

(Evaluation criteria)

A: 0%.

B: More than 0% to less then 2%.

C: More than 2%.

TABLE 1A

| | Example | | | | | | | | | |
|---|---|---|---|---|---|---|---|---|---|---|
| | 1 | 2 | 3 | 4 | 5 | 6 | 7 | 8 | 9 | 10 |
| Transfer Layers: Formulation of coating solution*1: | | | | | | | | | | |
| Kaolin: | 50.3 | 50.3 | 50.3 | 50.3 | 50.3 | 50.5 | 49.1 | 50.3 | 50.3 | 50.3 |
| Starch*: | 31.4 | 31.4 | 31.4 | 31.4 | 31.4 | 31.6 | 30.6 | 31.4 | 31.4 | 31.4 |
| Latex: | 15.7 | 15.7 | 15.7 | 15.7 | 15.7 | 15.8 | 15.3 | 15.7 | 15.7 | 15.7 |
| NaOH: | 0.1 | 0.1 | 0.1 | 0.1 | 0.1 | 0.1 | 0.1 | 0.1 | 0.1 | 0.1 |
| NaCl: | 2.5 | 2.5 | 2.5 | 2.5 | 2.5 | 2.0 | 5.0 | 2.5 | 2.5 | 2.5 |
| Layer thickness (μm, per one side): | 0.2 | 0.2 | 0.2 | 0.2 | 0.2 | 0.2 | 0.2 | 0.9 | 0.08 | 0.18 |
| Surface resistivity (Ω/square): | $5 \times 10^{12}$ | $5 \times 10^{12}$ | $5 \times 10^{12}$ | $5 \times 10^{12}$ | $5 \times 10^{12}$ | $7 \times 10^{13}$ | $8 \times 10^{11}$ | $5 \times 10^{12}$ | $1 \times 10^{13}$ | $5 \times 10^{12}$ |
| Coating weight ($g/m^2$, per one side): | 2.5 | 2.5 | 2.5 | 2.5 | 2.5 | 2.5 | 2.5 | 8.5 | 1.0 | 2.5 |
| Intermediate layer: Formulation of coating solution*2: | | | | | | | | | | |
| Kaolin: | 51.6 | 51.6 | 51.6 | 51.3 | 51.6 | 51.6 | 51.6 | 51.6 | 51.6 | 51.6 |
| Starch*: | 32.2 | 32.2 | 32.2 | 32.00 | 32.2 | 32.2 | 32.2 | 32.2 | 32.2 | 32.2 |
| Latex: | 16.1 | 16.1 | 16.1 | 16.0 | 16.1 | 16.1 | 16.1 | 16.1 | 16.1 | 16.1 |
| NaOH: | 0.1 | 0.1 | 0.1 | 0.1 | 0.1 | 0.1 | 0.1 | 0.1 | 0.1 | 0.1 |
| NaCl: | — | — | — | 0.6 | — | — | — | — | — | — |
| Surface resistivity (Ω/square): | $5 \times 10^{14}$ | $5 \times 10^{14}$ | $5 \times 10^{14}$ | $1 \times 10^{13}$ | $5 \times 10^{15}$ | $5 \times 10^{14}$ | $5 \times 10^{14}$ | $5 \times 10^{14}$ | $5 \times 10^{14}$ | $5 \times 10^{14}$ |
| Basis weight ($g/m^2$): | 157 | 127 | 104 | 157 | 158 | 157 | 157 | 169 | 156 | 157 |
| Smoothness (sec.): | 123 | 132 | 133 | 123 | 120 | 123 | 123 | 123 | 117 | 180 |
| Performance evaluation: 23° C./60% RH: | | | | | | | | | | |
| Image uniformity: | A | A | A | A | A | A | A | A | A | A |
| Transfer efficiency: | A | A | A | A | B | A | A | A | A | A |
| Double feeding: | A | A | A | A | A | A | A | A | A | A |
| 23° C./5% RH: | | | | | | | | | | |
| Image uniformity: | A | A | A | B | A | B | A | A | B | A |
| Transfer efficiency: | A | A | A | A | B | B | A | A | B | A |
| Double feeding: | A | A | A | A | A | A | A | A | A | A |

TABLE 1A-continued

| | Example | | | | | | | | | |
|---|---|---|---|---|---|---|---|---|---|---|
| | 1 | 2 | 3 | 4 | 5 | 6 | 7 | 8 | 9 | 10 |
| 30° C./80% RH: | | | | | | | | | | |
| Image uniformity: | A | A | A | B | A | A | B | B | A | B |
| Transfer efficiency: | A | A | A | B | A | A | B | A | A | A |
| Double feeding: | A | A | A | A | A | A | A | A | A | B |

*Oxidized starch
*1 and *2: The content proportion of each component material in each formulation of coating solution is a weight based on total solid matter in each formulation of coating solution.

TABLE 1B

| | Comparative Example | | | | | |
|---|---|---|---|---|---|---|
| | 1 | 2 | 3 | 4 | 5 | 6 |
| Transfer Layers: | | | | | | |
| Formulation of coating solution*1: | | | | | | |
| Kaolin: | 50.3 | 50.3 | 50.3 | 50.3 | 33.6 | 50.3 |
| Oxidized starch: | 31.4 | 31.4 | 31.4 | 31.4 | 42.0 | 31.4 |
| Latex: | 15.7 | 15.7 | 15.7 | 15.7 | 21.0 | 15.7 |
| NaOH: | 0.1 | 0.1 | 0.1 | 0.1 | 0.1 | 0.1 |
| NaCl: | 2.5 | 2.5 | 2.5 | 2.5 | 3.3 | 2.5 |
| Layer thickness (μm, per one side): | 0.2 | 0.2 | 0.2 | 0.2 | 0.2 | 0.8 |
| Surface resistivity (Ω/square): | $5 \times 10^{12}$ | $5 \times 10^{12}$ | $5 \times 10^{12}$ | $5 \times 10^{12}$ | $5 \times 10^{10}$ | $5 \times 10^{12}$ |
| Coating weight (g/m$^2$, per one side): | 2.5 | 2.5 | 2.5 | 1.0 | 2.5 | 8.0 |
| Intermediate layer: | | | | | | |
| Formulation of coating solution*2: | | | | | | |
| Kaolin: | 46.8 | 46.8 | 46.8 | 51.6 | 41.3 | 51.6 |
| Oxidized starch: | 29.2 | 29.2 | 29.2 | 32.2 | 25.8 | 32.2 |
| Latex: | 14.6 | 14.6 | 14.6 | 16.1 | 12.8 | 16.1 |
| NaOH: | 0.1 | 0.1 | 0.1 | 0.1 | 0.1 | 0.1 |
| NaCl: | 9.3 | 9.3 | 9.3 | — | 20.0 | — |
| Surface resistivity (Ω/square): | $5 \times 10^{10}$ | $5 \times 10^{10}$ | $5 \times 10^{10}$ | $5 \times 10^{14}$ | $5 \times 10^{10}$ | $5 \times 10^{14}$ |
| Basis weight (g/m$^2$): | 157 | 127 | 104 | 157 | 157 | 168 |
| Smoothness (sec.): | 125 | 127 | 131 | 60 | 122 | 220 |
| Performance evaluation: | | | | | | |
| 23° C./60% RH: | | | | | | |
| Image uniformity: | C | C | C | B | C | A |
| Transfer efficiency: | C | C | C | B | C | A |
| Double feeding: | A | A | A | A | A | C |
| 23° C./5% RH: | | | | | | |
| Image uniformity: | C | C | C | B | A | A |
| Transfer efficiency: | A | A | A | B | A | A |
| Double feeding: | A | A | A | A | A | C |
| 30° C./80% RH: | | | | | | |
| Image uniformity: | C | C | C | B | C | A |
| Transfer efficiency: | C | C | C | B | C | A |
| Double feeding: | A | A | A | A | A | C |

*1 and *2: The content proportion of each component material in each formulation of coating solution is a weight based on total solid matter in each formulation of coating solution.

EXAMPLE 11

In accordance with the production process as shown in FIG. 4, employing Fourdrinier paper making, paper was made using a pulp suspension prepared by mixing in L.B.K.P. (hardwood kraft pulp) 4% by weight of titanium oxide, 6% by weight of kaolin, 0.5% by weight of aluminum sulfate, 0.15% by weight of rosin size, 3.2% by weight of oxidized starch, 0% by weight of latex, 0.1% by weight of sodium hydroxide, 0.02% by weight of sodium chloride and 68% by weight of water-soluble binder, based on the dry weight of base sheet (pulp sheet) before coating. The pulp sheet obtained was dried in the first dry part to form an intermediate layer, and thereafter the intermediate layer was coated with the same transfer layer coating solution as used in Example 1, on its both sides by means of a roll coater in a coating weight of 2.5 g/m$^2$ for each side of the intermediate layer. Then the coatings formed were dried in the second dry part, and the sheet thus obtained was subjected to smoothing in the calender part making use of six rolls. Thus, transfer paper was produced.

The transfer paper obtained had a three-layer structure, having an intermediate layer with a layer thickness of 158 μm and transfer layers with a layer thickness of 0.2 μm each, respectively provided on the surface side and back side of the intermediate layer.

In the above transfer paper production process, the surface resistivity of the intermediate layer formed by paper making was $1\times10^{14}$ Ω/square, its basis weight being 153 g/m$^2$, and the surface resistivity of the transfer layers of the transfer paper thus produced was $5\times10^{12}$ Ω/square.

The transfer paper obtained had a basis weight of 158 g/m$^2$ and a Bekk smoothness of 123 seconds.

Using the transfer paper thus produced, evaluation was made in the same manner as in Example 1. As a result, better image uniformity than that in Example 1 was achieved in any environment.

What is claimed is:

1. A transfer paper for color electrophotography comprising:
   - an intermediate layer and transfer layers respectively provided on the surface side and back side of the intermediate layer, wherein;
   - said intermediate layer has a surface resistivity which is at least twice the surface resistivity of said transfer layers in an environment of 23° C./5%RH;
   - said transfer paper has a basis weight from 100 g/m$^2$ to 160 g/m$^2$; and
   - the surface of said transfer paper has a Bekk smoothness within the range from 100 seconds to 200 seconds.

2. The transfer paper according to claim 1, wherein the surface of said transfer paper has a Bekk smoothness within the range of from 100 seconds to 160 seconds.

3. The transfer paper according to claim 1, wherein said intermediate layer has a layer thickness of from 95 μm to 180 μm.

4. The transfer paper according to claim 1, wherein said intermediate layer has a layer thickness of from 120 μm to 150 μm.

5. The transfer paper according to claim 1, wherein said intermediate layer has a surface resistivity of $1\times10^{14}$ Ω/square or above in an environment of 23° C./5%RH.

6. The transfer paper according to claim 1, wherein said intermediate layer has a surface resistivity of from $5\times10^{14}$ Ω/square to $1\times10^{15}$ Ω/square in an environment of 23° C./5%RH.

7. The transfer paper according to claim 1, wherein said intermediate layer is formed of at least a pulp and a filler.

8. The transfer paper according to claim 1, wherein each of said transfer layers has a layer thickness from 0.1 μm to 0.8 μm.

9. The transfer paper according to claim 1, wherein each of said transfer layers has a layer thickness from 0.2 μm to 0.5 μm.

10. The transfer paper according to claim 1, wherein said transfer layers are formed by coating a transfer layer coating solution in a coating weight of from 1 g/m$^2$ to 8 g/m$^2$ in terms of dry solid matter per one side.

11. The transfer paper according to claim 1, wherein said transfer layers are formed by coating a transfer layer coating solution in a coating weight of from 2 g/m$^2$ to 8 g/m$^2$ in terms of dry solid matter per one side.

12. The transfer paper according to claim 1, wherein said transfer layers have a surface resistivity of from $1\times10^{12}$ Ω/square to $1\times10^{14}$ Ω/square in an environment of 23° C./5%RH.

13. The transfer paper according to claim 1, wherein said transfer layers have a surface resistivity of from $1\times10^{12}$ Ω/square to $5\times10^{13}$ Ω/square in an environment of 23° C./5%RH.

14. The transfer paper according to claim 1, wherein said transfer layers are formed of at least a water-soluble binder and a cationic or an anionic agent for decreasing surface resistivity of said transfer paper.

15. The transfer paper according to claim 1, wherein the surface resistivity of said intermediate layer is higher at least five times than the surface resistivity of said transfer layers in an environment of 23° C./5%RH.

16. The transfer paper according to claim 1, wherein said transfer layers are formed by coating a transfer layer coating solution on the surface side and back side of said intermediate layer by on-line coater.

17. The transfer paper according to claim 1, wherein said intermediate layer is formed by paper making by using a pulp suspension comprising a paper stuff containing a pulp and capable of making the intermediate layer have a surface resistivity of $1\times10^{14}$ Ω/square or above in an environment of 23° C./5%RH.

18. The transfer paper according to claim 1, wherein said intermediate layer is formed by paper making by using a pulp suspension comprising a paper stuff containing a pulp, and thereafter coating an intermediate layer coating solution capable of making the intermediate layer have a surface resistivity of $1\times10^{14}$ Ω/square or above in an environment of 23° C./5%RH.

19. The transfer paper according to claim 1, wherein said intermediate layer and said transfer layers contain conductive agents of the types different from each other.

20. The transfer paper according to claim 1, wherein said intermediate layer and said transfer layers each contain a conductive agent, and the conductive agent contained in said transfer layers is in a larger amount than the conductive agent contained in said intermediate layer.

21. The transfer paper according to claim 14, wherein said intermediate layer and said transfer layers contain the cationic or the anionic agent for decreasing surface resistivity of the transfer paper of the types different from each other.

22. The transfer paper according to claim 1, wherein said transfer layer comprises at least a water-soluble binder and a conductive agent.

23. The transfer paper according to claim 22, wherein said conductive agent contains at least one member selected from the group consisting of sodium chloride, potassium chloride, sodium sulfate, potassium sulfate, a styrene-maleic acid copolymer and a quaternary ammonium salt.

* * * * *